M. HITCHCOCK.
Saw-Setting Anvils.
No. 153,339.
Patented July 21, 1874.
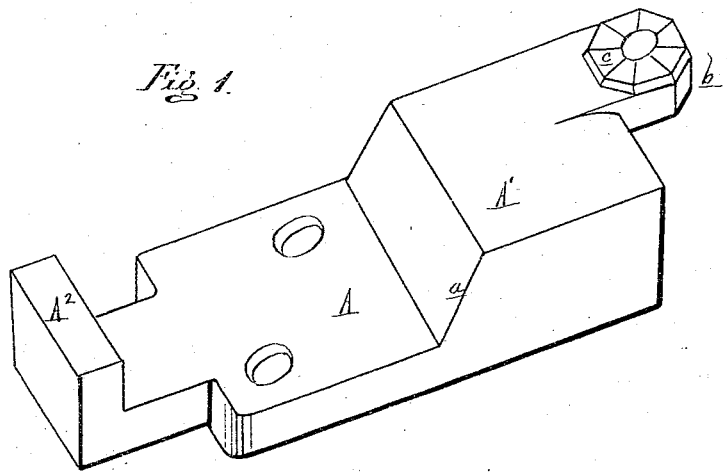
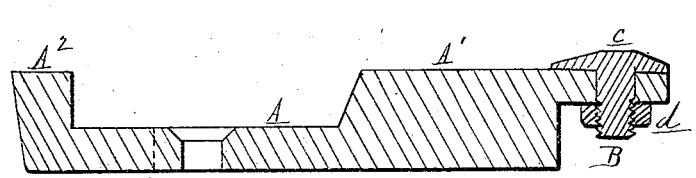
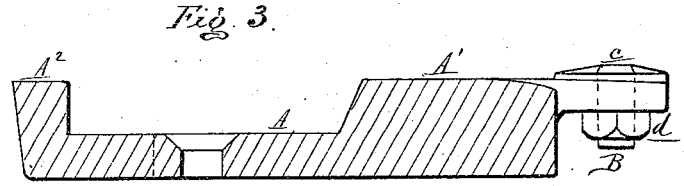
Attest:
C. E. B. Questo
S. J. Clark
Inventor:
M. Hitchcock
per Attorney
Tho. S. Sprague

UNITED STATES PATENT OFFICE.

MARTIN HITCHCOCK, OF HILLSDALE, ASSIGNOR TO HIMSELF AND JAMES M. HITCHCOCK, OF DETROIT, MICHIGAN.

IMPROVEMENT IN SAW-SETTING ANVILS.

Specification forming part of Letters Patent No. 153,339, dated July 21, 1874; application filed May 14, 1874.

*To all whom it may concern:*

Be it known that I, MARTIN HITCHCOCK, of Hillsdale, in the county of Hillsdale and State of Michigan, have invented an Improvement in Saw-Sets, of which the following is a specification:

The nature of this invention relates to an improvement in that class of hammer-sets which are employed for setting the teeth of crosscut, circular, and other large-toothed saws, whereby greater accuracy and uniformity of set may be secured; and it consists in an anvil-plate having a sloped beckhorn at one end with an eccentrically-headed gage-bolt, and alongside the horn a slope on the edge of the plate at a greater inclination than will ever be required to give a tooth. The teeth are first set to this excessive deflection, and then set back to the proper angle on the horn, thereby avoiding the irregularities arising from the spring of the teeth in the ordinary way of setting.

Figure 1 is a perspective view of the set. Fig. 2 is a cross-section of the same at *x x*. Fig. 3 is a cross-section at *y y*. Fig. 4 is an inverted plan of the gage-bolt.

In the drawing, A represents a plate, having an anvil, A$^1$, at one end, and a rest, A$^2$, at the other to support the saw-blade flat upon the anvil. One-half the front edge of the anvil is sloped or beveled, as at *a*, to a greater inclination than will ever be required to give a finished tooth. The other half of the anvil end has a projecting horn, *b*, whose upper surface is sloped to the proper angle for setting saw-teeth. Through a hole in the horn is inserted a bolt, B, having an eccentric polygonal head, *c*, and is provided with a nut, *d*, for securing it fast in any position.

In setting a saw the ends of the teeth are first "overset" on the bevel *a*, and then the gage-bolt is turned so that one of the faces of its head will disclose so much of the beveled face of the horn as will serve to give the tooth the required set. The overset teeth are then brought successively to the horn, each tooth point resting against the gage-bolt, while a tap of the hammer upon the tooth takes out a portion of the set, leaving in it the set determined by the gage. My reason for doing this is, that in the ordinary way of setting a saw with a hammer, the teeth spring back more or less in setting, and as this springing back is irregular or varies with each tooth, the saw is not uniformly set, while by my improved set, and method of using it, the teeth will be uniformly set, as there is no spring to the tooth in taking out a portion of its set.

What I claim as my invention, and desire to secure by Letters Patent, is—

The herein-described saw-set, consisting of the plate A, anvil A$^1$, provided with the sloping end *a*, sloped horn *b*, and gage-bolt B, provided with the eccentric polygonal head *c* and nut *d*, substantially as shown and set forth.

MARTIN HITCHCOCK.

Witnesses:
   H. F. EBERTS,
   H. S. SPRAGUE.